United States Patent
Sun

(10) Patent No.: US 11,028,326 B2
(45) Date of Patent: Jun. 8, 2021

(54) PROCESS FOR HYDROTREATING A RESIDUE STREAM WITH HYDROGEN RECYCLE

(71) Applicant: UOP LLC, Des Plaines, IL (US)

(72) Inventor: Ping Sun, Riverside, IL (US)

(73) Assignee: UOP LLC, Des Plaines, IL (US)

(*) Notice: Subject to any disclaimer, the term of this patent is extended or adjusted under 35 U.S.C. 154(b) by 179 days.

(21) Appl. No.: 15/884,219

(22) Filed: Jan. 30, 2018

(65) Prior Publication Data
US 2019/0233732 A1    Aug. 1, 2019

(51) Int. Cl.
| | | |
|---|---|---|
| C10G 65/04 | (2006.01) | |
| C10B 57/00 | (2006.01) | |
| C10G 7/00 | (2006.01) | |
| B01D 3/14 | (2006.01) | |
| B01D 3/06 | (2006.01) | |
| B01D 53/02 | (2006.01) | |
| B01D 53/14 | (2006.01) | |
| B01D 3/42 | (2006.01) | |

(52) U.S. Cl.
CPC ............... *C10B 57/005* (2013.01); *B01D 3/06* (2013.01); *B01D 3/143* (2013.01); *B01D 53/02* (2013.01); *B01D 53/1468* (2013.01); *C10G 7/00* (2013.01); *C10G 65/04* (2013.01); *B01D 3/4205* (2013.01); *C10G 2300/1077* (2013.01); *C10G 2300/202* (2013.01); *C10G 2300/206* (2013.01); *C10G 2300/708* (2013.01); *C10G 2400/16* (2013.01)

(58) Field of Classification Search
CPC ............................... C10G 65/02; C10G 65/04
See application file for complete search history.

(56) References Cited

U.S. PATENT DOCUMENTS

| | | | | |
|---|---|---|---|---|
| 3,761,399 A | * | 9/1973 | McKinney | C10G 65/04 208/210 |
| 3,898,155 A | * | 8/1975 | Wilson | B01J 35/10 208/216 PP |
| 4,225,421 A | * | 9/1980 | Hensley, Jr. | B01J 23/28 208/112 |
| 4,272,357 A | * | 6/1981 | Rollmann | C10G 49/007 208/210 |
| 6,217,746 B1 | | 4/2001 | Thakkar et al. | |
| 6,547,956 B1 | | 4/2003 | Mukherjee et al. | |
| 6,797,154 B2 | | 9/2004 | Mukherjee et al. | |

(Continued)

OTHER PUBLICATIONS

Chen et.al., HDS kinetics study of dibenzothiophenic compounds in LCO, Catalysis Today 98 (2004) 227-233.

(Continued)

*Primary Examiner* — Michelle Stein
(74) *Attorney, Agent, or Firm* — Paschall & Associates, LLC; James C. Paschall

(57) ABSTRACT

The subject process enhances catalytic activity for demetallization and desulfurization of a residue feed stream by splitting a recycle hydrogen stream and feeding each of the split hydrogen streams to the first and second stages of demetallation and desulfurization, respectively, with interstage separation. The recycle hydrogen stream may first undergo scrubbing to remove acid gases and compression before recycle. The recycle hydrogen stream is taken from a first hot vapor stream from the first hydrotreating unit and a second hot vapor stream from the second hydrotreating unit.

20 Claims, 2 Drawing Sheets

(56) References Cited

U.S. PATENT DOCUMENTS

| | | | |
|---|---|---|---|
| 6,881,389 B2 | 4/2005 | Paulsen et al. | |
| 7,238,277 B2 | 7/2007 | Dahlberg et al. | |
| 7,384,540 B2 | 6/2008 | Renaud | |
| 7,531,082 B2 | 5/2009 | Mukherjee et al. | |
| 7,575,670 B1* | 8/2009 | VanWees | C10G 65/04 208/210 |
| 7,651,604 B2 | 1/2010 | Ancheyta et al. | |
| 8,435,400 B2 | 5/2013 | Kou et al. | |
| 8,679,322 B2 | 3/2014 | Marzin et al. | |
| 10,253,272 B2* | 4/2019 | Sun | C10G 67/00 |
| 2006/0131212 A1* | 6/2006 | Dahlberg | C10G 65/10 208/59 |
| 2006/0196809 A1* | 9/2006 | Mukherjee | C10G 65/04 208/57 |
| 2010/0147743 A1* | 6/2010 | MacArthur | C10G 65/04 208/57 |
| 2016/0122666 A1 | 5/2016 | Weiss et al. | |

OTHER PUBLICATIONS

Chen et.al., HDS reactivities of dibenzothiophenic compounds in a LC-finer LGO and H2S/NH3 inhibition effect, National Centre for Upgrading Technology (NCUT), One Oil Patch Drive, Devon, Alta., Canada T9G 1A8, Received Mar. 20, 2003; revised Aug. 1, 2003; accepted Aug. 2, 2003; available online Sep. 17, 2003, Fuel 83 (2004) 305-313.

Kasrai, Sulphur speciation in bitumens and asphaltenes by X-ray absorption fine structure spectroscopy, Received Aug. 16, 1993; accepted in revised form Feb. 8, 1994.

Waldo et.al., Determination of the chemical environment of sulphur in petroleum asphaltenes by X-ray absorption spectroscopy, Department of Chemistry, University of Michigan, Ann Arbor, MI 48109, USA, Division of Applied Science, Lawrence Berkeley Laboratory, Berkeley, CA 94720, USA (Received Feb. 7, 1991; revised Jul. 1, 7991).

* cited by examiner

PROCESS FOR HYDROTREATING A RESIDUE STREAM WITH HYDROGEN RECYCLE

FIELD

The field is the hydrotreating of residue streams. Specifically, the field is the desulfurization of residue streams.

BACKGROUND

Hydroprocessing includes processes which convert hydrocarbons in the presence of hydroprocessing catalyst and hydrogen to more valuable products. Hydrotreating is a process in which hydrogen is contacted with a hydrocarbon stream in the presence of hydrotreating catalysts which are primarily active for the removal of heteroatoms, such as sulfur, nitrogen and metals, such as iron, nickel, and vanadium from the hydrocarbon feedstock.

Residue or resid streams are produced from the bottom of a fractionation column. Resid hydrotreating is a hydrotreating process to remove metals, sulfur and nitrogen from an atmospheric residue (AR) or a vacuum residue (VR) feed, so that it can be cracked to valuable fuel products.

Hydrotreating of resid streams requires high severity. Resid desulfurization units typically have hydrodemetallization (HDM) catalyst up front, followed by hydrodesulfurization (HDS) catalyst. Frequently, a resid hydrotreating unit is metal limited so the HDM catalyst is not fully utilized relative to its residual ability to hydrotreat more resid feed at the time of unit shutdown or turnaround. At the reactor inlet, HDM catalyst is fully adsorbed of metals where the feed metals are most concentrated. However, in downstream HDM catalyst beds, the lower concentration of metals in the feed operates to avoid full adsorption onto the HDM catalyst. Metal laying down on HDM catalyst causes the chemical reaction rate to decrease, which primarily occurs on the HDM catalyst surface. In practice, the reactor temperature is increased to compensate for the reaction rate decrease. Thus, when a portion of HDM catalyst in a demetallation reactor is saturated with metal, metals in the feed migrate to downstream HDS catalyst beds which affects HDS activity. In addition, coke buildup also affects reaction rate negatively across all catalyst beds. At a later stage of operation, metal breakthrough into downstream HDS catalyst beds starts to occur when temperature adjustment cannot compensate for the desulfurization reaction rate decrease. Consequently, the unit is shut down and the cycle is ended for replacement with fresh catalyst.

Refiners frequently desire a constant product quality in hydrotreated product below a certain sulfur specification. When a higher desulfurization reaction rate can be obtained and maintained throughout operation of a fixed unit cycle period, manifested as a consistent temperature profile along the unit cycle period, better product quality is achieved across the cycle for the same volume of catalyst.

Resid hydrocarbon feed features a higher boiling point range, larger molecular weight and greater aromaticity which results in higher insolubility in a typical n-heptane solvent, frequently referred as to asphaltenes. In a resid hydrocarbon feed, sulfur content frequently associates with the asphaltenes and carbon residue J. Speight, *The Desulfurization Of Heavy Oils And Residua*, chapters 2 and 6 (CRC Press 2d ed. 1981), revealing the greater tendency of sulfur species to embed in aromatic asphaltic compounds in a resid feed. With strong associations of sulfur species with asphaltic content in a typical resid feed with about 3-6 wt % sulfur and 5-25 wt % asphaltenes, a resid feed may comprise at least 10-50 wt % sulfur in asphaltic form. Competition between desulfurization and demetallation reactions occurs simultaneously, making desulfurization of asphaltic sulfur more difficult. Asphaltene molecules are also known to pose diffusion limitations, causing slower kinetic rates for removing heteroatoms from asphaltene molecules. Furthermore, aromatic sulfur has a lower intrinsic kinetic rate than sulfide molecules. Moreover, among all aromatic sulfur species, multi-ring thiophenes and substituted thiophenes are known to have the lowest reaction rate when under typical hydroprocessing conditions. Frequently, refiners target a sulfur and metal specification depending on a downstream application of hydrotreated products. Contemporary refiners often find a need to desulfurize at least a portion of the most refractory sulfur species to meet regulatory requirements.

Complicating the product sulfur specification in a resid feed is the high concentration of asphaltic sulfur which features sulfur in an asphaltic and aromatic macromolecule matrix, which may further associate with multi-ring thiophenes such as benzothiophene, and dibenzothiophenes in a resid feed. Hydrogen sulfide formed during the desulfurization process adds additional difficulties for deeper desulfurization. Analytically identifiable multi-ring thiophenes and substituted thiophenes in a distillate feedstock are reported to be significantly inhibited for hydrodesulfurization reactions in the presence of hydrogen sulfide. J. Chen, *HDS Reactivities of Dibenzothiophenic Compounds in a LC-Finer LGO and H2S/NH3 Inhibition Effect*, 83 Fuel (2004) 305, 311. Removal of refractory sulfur in a resid feedstock is likely made difficult by the presence of hydrogen sulfide especially at final deeper desulfurization steps, but support of a theoretical proof is limited by the availability of analytical tools than can decipher the complexities of asphaltic macromolecule matrices in a resid feed. Hence, reducing hydrogen sulfide concentration in the treat gas is important in resid hydrotreating.

It would be highly desirable to have a hydrotreating process that can efficiently demetallize and desulfurize a resid stream.

BRIEF SUMMARY

The subject process enhances catalytic activity for demetallization and desulfurization of a residue feed stream by recycling hydrogen gas from each of two stages of demetallization and desulfurization, respectively, back to each of the two stages. The recycled hydrogen gas may be scrubbed and recompressed before it is recycled to the demetallization and desulfurization stages, respectively.

DEFINITIONS

Figure 1:
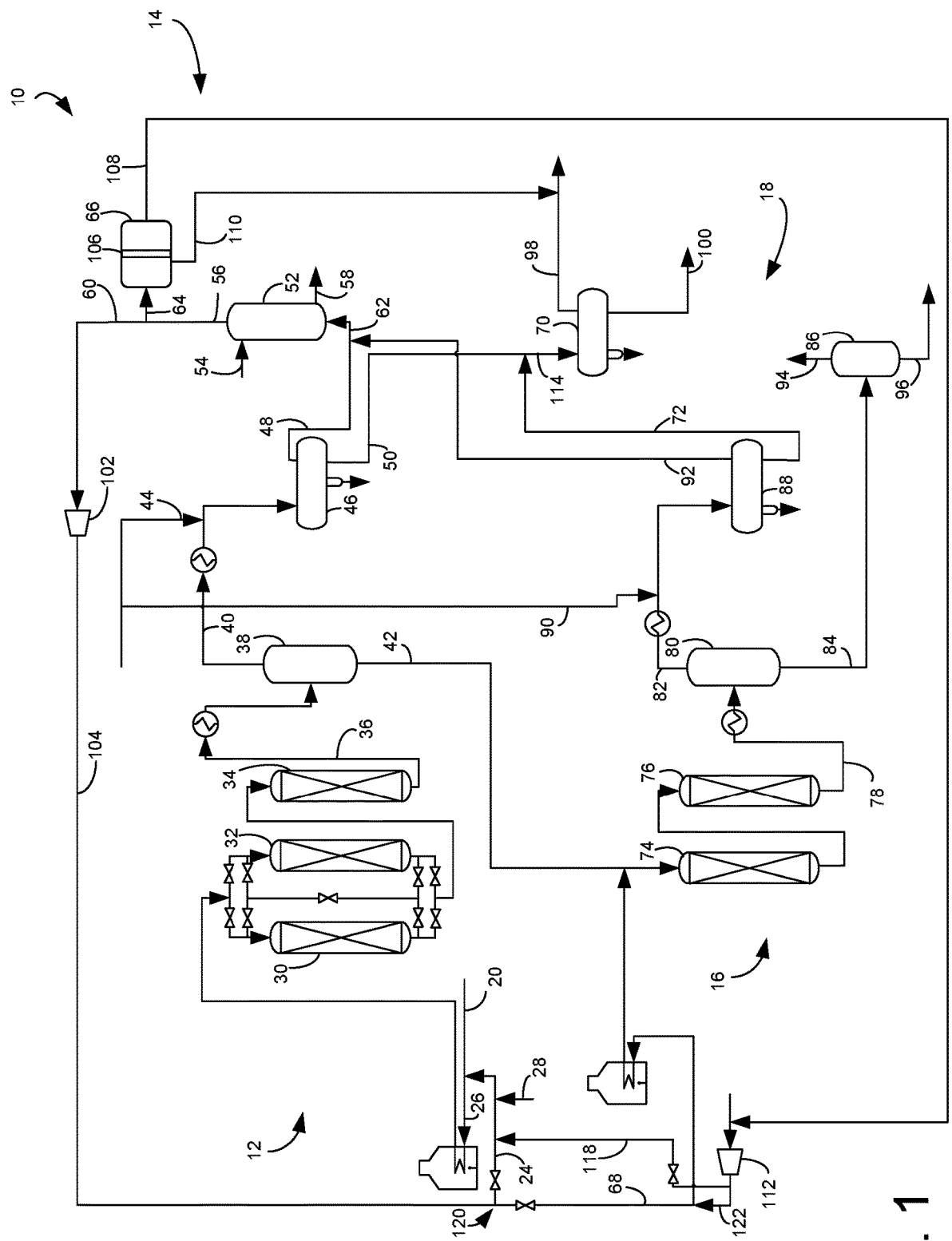
FIG. 1 is a schematic drawing of a two-stage hydrodesulfurization unit.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Absorber and scrubbing columns do not include a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The overhead pressure is the pressure of the overhead vapor at the vapor outlet of the column. The bottom temperature is the liquid bottom outlet temperature. Overhead lines and bottoms lines refer to the net lines from the column downstream of any reflux or reboil to the column unless otherwise indicated. Stripping columns omit a reboiler at a bottom of the column and instead provide heating requirements and separation impetus from a fluidized inert vaporous media such as steam.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "initial boiling point" (IBP) means the temperature at which the sample begins to boil using ASTM D-7169.

As used herein, the term "T5", "T70" or "T95" means the temperature at which 5 mass percent, 70 mass percent or 95 mass percent, as the case may be, respectively, of the sample boils using ASTM D-7169.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator which latter may be operated at higher pressure.

DETAILED DESCRIPTION

The subject process enhances catalytic activity for demetallization and desulfurization of a residue feed stream by splitting a recycle hydrogen stream and feeding each of the split hydrogen streams to two separate hydrotreating stages, a demetallation stage and a desulfurization stage, respectively, with interstage separation. The recycle hydrogen stream may first undergo scrubbing to remove acid gases and compression before recycle. The recycle hydrogen stream may be taken from a first hot vapor stream from a first stage hydrotreating unit 12 and a second hot vapor stream from a second stage hydrotreating unit 16.

The process 10 for hydrotreating a hydrocarbon resid stream comprises the first stage hydrotreating unit 12, a first stage separation section 14, the second stage hydrotreating unit 16 and a second stage separation section 18.

A hydrocarbon resid stream in resid line 20 and a first stage hydrogen stream in a first hydrogen line 24 are fed to the first stage hydrotreating unit 12. A stream of water in water feed line 28 may be also delivered to the first stage hydrotreating unit 12. The stream of water may comprise 0.5 to about 6 wt % and preferably about 3 to about 5.5 wt % water based on the weight of the resid hydrocarbon stream in resid line 20. In an aspect, the water stream may be added or pumped into the first stage hydrogen stream in the first stage hydrogen line 24 to mix the streams. The stream of water may be provided from boiler feed water which is condensed from steam and therefore comprises little or no salts.

In one aspect, the process described herein are particularly useful for hydrotreating a hydrocarbon feed stream comprising a hydrocarbonaceous resid feedstock. A resid feedstock may be taken from a bottom of an atmospheric fractionation column or a vacuum fractionation column. A suitable resid feed is AR having an T5 between about 316° C. (600° F.) and about 399° C. (750° F.) and a T70 between about 510° C. (950° F.) and about 704° C. (1300° F.). VR having a T5 in the range between about 482° C. (900° F.) and about 565° C. (1050° F.) may also be a suitable feed. VR, atmospheric gas oils having T5 between about 288° C. (550° F.) and about 315° C. (600° F.) and vacuum gas oils (VGO) having T5 between about 316° C. (600° F.) and about 399° C. (750° F.) may also be blended with the AR to make a suitable resid feed. Deasphalted oil, visbreaker bottoms, clarified slurry oils, and shale oils may also be suitable resid feeds alone or by blending with AR or VR.

Typically, resid feeds contain a significant concentration of metals which have to be removed before deeper catalytic desulfurization can occur because the metals will adsorb on the HDS catalyst making it inactive. Typically, suitable resid feeds include about 50 to about 500 wppm metals but resid feeds with less than about 200 wppm metals may be preferred. Nickel, vanadium and iron are some of the typical metals in resid feeds. Resid feeds may comprise about 5 to about 200 wppm nickel, about 50 to about 500 wppm vanadium, about 1 to about 150 wppm iron and/or about 5 to about 25 wt % Conradson carbon residue. Resid feeds may comprise about 10,000 wppm to about 60,000 wppm sulfur. The resid feed stream typically comprises an asphaltic sulfur concentration of at least 10 wt % of the total sulfur in the resid feed stream. In other words, 10 wt % of the sulfur in the resid feed stream is incorporated into an asphalt molecule. Preferably, the resid feed stream comprises at least 20 wt % asphaltic sulfur and in an aspect, no more than 50 wt % asphaltic sulfur.

The first stage hydrogen stream in the first hydrogen line 24 may be added to the resid stream in the resid line 20 to provide a feed resid stream in a feed resid line 26. The feed resid stream in the feed resid line 26 may be heated in a fired heater. The heated feed resid stream in the feed resid line 26 may be fed to a first resid hydrotreating unit 12. With the water stream from a water line 28 added to the first stage hydrogen stream in line 24, the first stage hydrogen stream, the water stream and the resid stream in line 20 may all be heated together in the fired heater in feed resid line 26.

Hydrotreating is a process wherein hydrogen is contacted with hydrocarbon in the presence of hydrotreating catalysts which are primarily active for the removal of heteroatoms, such as sulfur, nitrogen and metals from the hydrocarbon feedstock. The first hydrotreating unit 12 may comprise three demetallizing reactors comprising a first demetallizing reactor 30, a second demetallizing reactor 32 and a third demetallizing reactor 34. More or less demetallizing reactors may be used, and each demetallizing reactor 30, 32 and 34 may comprise a part of a demetallizing reactor or comprise one or more demetallizing reactors. Each demetallizing reactor 30, 32 and 34 may comprise part of a catalyst bed or one or more catalyst beds in one or more demetallizing reactor vessels. In FIG. 1, the first hydrotreating unit 12 comprises three demetallizing reactors 30, 32 and 34 each comprising a single bed of HDM catalyst.

Multiple demetallizing reactors 30, 32, 34 may also include demetallizing reactors operating in swing bed mode and/or in lead-lag mode. In one aspect, the first demetallizing reactor 30 and the second demetallizing reactor 32 may operate in swing bed and/or in lead lag mode. In an embodiment, the first demetallizing reactor 30 and the second demetallizing reactor 32 are in series with the first demetallizing reactor 30 in the lead and the second demetallizing reactor 32 in the lag, downstream of the first demetallizing reactor 30. The second demetallizing reactor 32 may be switched to the lead when the first demetallizing reactor 30 is shut down for catalyst replacement or regeneration when the demetallization catalyst therein has lost activity beyond a desired level. In this embodiment, the second demetallizing reactor 32 may stay in the lead even after the first demetallizing reactor 30 is brought back on stream in the lag, downstream of the second demetallizing reactor 30. The second demetallizing reactor 32 may stay in the lead until it is shut down for catalyst replacement or regeneration due to lost catalyst activity, in which case the first demetallizing reactor 32 is returned to the lead as the cycle resumes. The third demetallizing reactor 34 may also be operated in the lead-lag cycle with the first demetallizing reactor 30 and the second demetallizing reactor 32 or not.

Suitable HDM catalysts for use in the first resid hydrotreating unit 12 are any conventional resid hydrotreating catalysts and include those which are comprised of at least one Group VIII metal, preferably iron, cobalt and nickel, more preferably nickel and/or cobalt and at least one Group VI metal, preferably molybdenum and tungsten, on a support material, preferably alumina. Pore volume and surface area is designed for a balance between chemical reaction activity and storage capacity for metal sulfide products. It is within the scope of the present invention that more than one type of hydrotreating catalyst be used in the same reaction vessel or catalyst bed. The Group VIII metal is typically present on the HDM catalyst in an amount ranging from about 1 to about 10 wt %, preferably from about 2 to about 5 wt %. The Group VI metal will typically be present on the HDM catalyst in an amount ranging from about 1 to about 20 wt %, preferably from about 2 to about 10 wt %.

In an embodiment, the first demetallation reactor 30, the second demetallation reactor 32 and the third demetallation reactor 34 may comprise a HDM catalyst comprising cobalt and molybdenum on gamma alumina. The HDM catalyst in the first demetallation reactor 30, the second demetallation reactor 32 and the third demetallation reactor 34 may have a bimodal pore size distribution with at least about 25% of the pores on the catalyst particle being characterized as small pores, in the micropore or mesopore range of about 5 to no more than about 30 nm and at least about 25% of the pores being characterized as large pores, in the mesopore or macropore range of greater than about 30 to about 100 nm. The large pores are more suited for demetallation and the small pores are more suited for desulfurization. The ratio of large pores to small pores may decrease from upstream to downstream in the first demetallation reactor 30, the second demetallation reactor 32 and the third demetallation reactor 34. In an aspect, the first demetallation reaction 30 will have a larger ratio of large pores to small pores than the second demetallation reactor 32. In a further aspect, the second demetallation reaction 32 will have a larger ratio of large pores to small pores than the third demetallation reactor 34.

The feed resid stream in line 26 may be fed to the first demetallation reactor 30, the second demetallation reactor 32 and the third demetallation reactor 34. The first demetallation reactor 30, the second demetallation reactor 32 and the third demetallation reactor 34 may be arranged in series such that the effluent from one cascades into the inlet of the next. It is contemplated that more or less demetallation reactors may be provided in the first stage hydrotreating unit 12. The first demetallation reactor 30, the second demetallation reactor 32 and the third demetallation reactor 34 are intended to demetallize the heated resid stream, so to reduce the metals concentration in the fresh feed stream by about 40 to about 100 wt % and typically about 65 to about 95 wt % to produce a demetallized effluent stream exiting one, some or all of the first demetallation reactor 30, the second demetallation reactor 32 and the third demetallation reactor 34. The metal content of the demetallized resid stream may be less than about 50 wppm and preferably between about 1 and about 25 wppm. The first demetallation reactor 30, the second demetallation reactor 32 and the third demetallation reactor 34 may also desulfurize and denitrogenate the resid stream. A demetallized resid stream reduced in metals and sulfur concentration relative to the feed resid stream fed to the reactor may exit first demetallation reactor 30, the second demetallation reactor 32 and the third demetallation reactor 34.

Preferred reaction conditions in each of the first demetallation reactor 30, the second demetallation reactor 32 and the third demetallation reactor 34 include a temperature from about 66° C. (151° F.) to about 455° C. (851° F.), suitably 316° C. (600° F.) to about 427° C. (800° F.) and preferably 343° C. (650° F.) to about 399° C. (750° F.), a pressure from about 2.1 MPa (gauge) (300 psig) to about 27.6 MPa (gauge) (4000 psig), preferably about 13.8 MPa (gauge) (2000 psig) to about 20.7 MPa (gauge) (3000 psig), a liquid hourly space velocity of the fresh resid feed from about 0.1 $hr^{-1}$ to about 5 $hr^{-1}$, preferably from about 0.2 to about 2 $hr^{-1}$, and a hydrogen rate of about 168 $Nm^3/m^3$ (1,000 scf/bbl) to about 1,680 $Nm^3/m^3$ oil (10,000 scf/bbl), preferably about 674 $Nm^3/m^3$ oil (4,000 scf/bbl) to about 1,011 $Nm^3/m^3$ oil (6,000 scf/bbl).

The first stage demetallized resid stream may exit the third demetallation reactor 34 or whichever demetallation reactor 30, 32, 34 is the last on stream in the first demetallized effluent line 36, be cooled by heat exchange and enter the first stage separation section 14 comprising a first stage hot separator 38. The first stage separation section 14 comprises one or more separators in downstream communication with the first hydrotreating unit 12 including the first stage hot separator 38. The first demetallized effluent line 36 delivers a cooled demetallized effluent stream to the first stage hot separator 38. Accordingly, the first stage hot separator 38 is in downstream communication with the first demetallation reactor 30, the second demetallation reactor 32 and the third demetallation reactor 34.

The first stage hot separator 38 separates the demetallized resid stream to provide a hydrocarbonaceous, first stage hot vapor stream in a first hot overhead line 40 and a hydrocarbonaceous, first stage hot liquid stream in a first hot bottoms line 42. The first stage hot vapor stream comprises the bulk of the hydrogen sulfide from the demetallized resid stream. The first stage liquid stream has a smaller concentration of hydrogen sulfide than the desulfurized resid stream.

The first stage hot separator 38 may operate at about 177° C. (347° F.) to about 371° C. (700° F.) and preferably operates at about 232° C. (450° F.) to about 315° C. (600° F.). The first stage hot separator 38 may be operated at a slightly lower pressure than the first desulfurization reactor 34 accounting for pressure drop through intervening equipment. The first stage hot separator 38 may be operated at pressures between about 3.4 MPa (gauge) (493 psig) and about 20.4 MPa (gauge) (2959 psig). The hydrocarbonaceous, first stage hot vapor stream in the first hot overhead line 40 may have a temperature of the operating temperature of the first stage hot separator 38. The first stage hot liquid stream in the first hot bottoms line 42 may be mixed with a second stage hydrogen stream in a second hydrogen line 68 and be fed to the second hydrotreating unit 16.

The first stage hot vapor stream in the first hot overhead line 40 may be cooled by heat exchange before entering a first stage cold separator 46. The first stage cold separator 46 may be in downstream communication with the hot overhead line 40.

As a consequence of the reactions taking place in the first stage hydrotreating unit 12 wherein nitrogen, chlorine and sulfur are reacted from the feed, ammonia, hydrogen chloride and hydrogen sulfide are formed. The first stage hot separator 38 removes the hydrogen sulfide and ammonia from the demetallized effluent stream in the demetallized effluent line 36 into the first stage vapor stream in the hot overhead line 40 to provide a sweetened, demetallized resid stream in the first stage hot liquid line for desulfurization in the second hydrotreating unit 16.

At a characteristic sublimation temperature, ammonia and hydrogen sulfide will combine to form ammonium bisulfide and ammonia, and chlorine will combine to form ammonium chloride. Each compound has a characteristic sublimation temperature that may allow the compound to coat equipment, particularly heat exchange equipment, impairing its performance. To prevent such deposition of ammonium bisulfide or ammonium chloride salts in the first hot overhead line 40 transporting the first stage hot vapor stream, a suitable amount of wash water may be introduced into the first hot overhead line 40 by a first water wash line 44.

The cooled first stage vapor stream may be separated in the cold separator 46 to provide a first stage cold vapor stream comprising a hydrogen-rich gas stream including ammonia and hydrogen sulfide in a first cold overhead line 48 and a first stage cold liquid stream in a first cold bottoms line 50. The cold separator 46 serves to separate hydrogen rich gas from hydrocarbon liquid in the first stage hot vapor stream for recycle to the first stage hydrotreating unit 12 and the second stage hydrotreating unit 16. The first stage cold separator 46, therefore, is in downstream communication with the first hot overhead line 40 of the first stage hot separator 38.

The cold separator 46 may be operated at about 100° F. (38° C.) to about 150° F. (66° C.), suitably about 115° F. (46° C.) to about 145° F. (63° C.), and just below the pressure of the last demetallation reactor 30, 32, 34 and the first stage hot separator 38 accounting for pressure drop through intervening equipment to keep hydrogen and light gases in the overhead and normally liquid hydrocarbons in the bottoms. The first stage cold separator 46 may be operated at pressures between about 3 MPa (gauge) (435 psig) and about 20 MPa (gauge) (2,901 psig). The first stage cold separator 46 may also have a boot for collecting an aqueous phase. The first stage cold liquid stream in the first cold bottoms line 50 may have a temperature of the operating temperature of the cold separator 46. The first stage cold liquid stream in the first cold bottoms line 50 may be delivered to a cold flash drum 70, in an embodiment after mixing with a second stage cold liquid stream in a second cold bottoms line 72. The cold flash drum 70 may be in downstream communication with the first cold bottoms line 50 of the first cold separator 46.

A demetallized first stage liquid stream exits the first hydrotreating unit 12 and the first stage separation section 14 in the first stage liquid stream transported in the first hot liquid line 42 with a reduced concentration of metals, sulfur and nitrogen relative to the hydrocarbon resid stream in line 20. The second stage hydrogen stream in second hydrogen line 68 is heated in a fired heater and mixed with the demetallized resid stream in the first hot separator bottoms line 42 and fed to the second hydrotreating unit 16. The first stage liquid stream is still at elevated temperature and may not need further heating before entering the second stage hydrotreating unit 16.

In an embodiment, the second hydrotreating unit 16 comprises a first desulfurization reactor 74 and a second desulfurization reactor 76 which may include a hydrodesulfurization (HDS) catalyst. More or less desulfurization reactors may be used. The HDS catalyst may comprise nickel or cobalt and molybdenum on gamma alumina to convert organic sulfur to hydrogen sulfide. The HDS catalyst may have a monomodal distribution of mesoporous pore sizes with at least 50% of the pores on the catalyst particle being in the range of 10-50 nm. The first desulfurization reactor 74 and the second desulfurization reactor 76 may be operated in series with the effluent from the first desulfurization reactor 74 cascading into an inlet of the second desulfurization reactor 76. The first desulfurization reactor 74 and the second desulfurization reactor 76 desulfurize the demetallized resid feed to reduce the sulfur concentration in the demetallized resid stream by about 40 to about 100 wt % and typically by about 65 to about 95 wt % to produce a desulfurized effluent stream exiting the second desulfurization reactor 76 in a desulfurized effluent line 78. The bulk of the desulfurization of more reactive sulfur species, however, does occur in the first stage hydrotreating unit 12.

Preferred reaction conditions in each of the first desulfurization reactor 74 and the second desulfurization reactor 76 include a temperature from about 66° C. (151° F.) to about 455° C. (850° F.), suitably 316° C. (600° F.) to about 427° C. (800° F.) and preferably 343° C. (650° F.) to about 410° C. (770° F.), a pressure from about 690 kPa (gauge) (100 psig) to about 24.1 MPa (gauge) (3500 psig), preferably about 12.4 MPa (gauge) (1800 psig) to about 17.2 MPa (gauge) (2500 psig), a liquid hourly space velocity of the fresh resid feed from about 0.1 $hr^{-1}$ to about 5 $hr^{-1}$, preferably from about 0.2 to about 2 $hr^{-1}$, and a hydrogen rate of about 168 $Nm^3/m^3$ (1,000 scf/bbl) to about 1,680 $Nm^3/m^3$ oil (10,000 scf/bbl), preferably about 674 $Nm^3/m^3$ oil (4,000 scf/bbl) to about 1,011 $Nm^3/m^3$ oil (6,000 scf/bbl).

In one aspect, the first desulfurization reactor 74 and the second desulfurization reactor 76 operates at a pressure of about 1.4 MPa (gauge) (200 psig) to about 3.5 MPa (gauge) (500 psig) lower than the three demetallizing reactors comprising the first demetallizing reactor 30, the second demetallizing reactor 32 and the third demetallizing reactor 34 in the first stage hydrotreating unit 12 and the hot separator 38 to enable transport of the first stage hot liquid stream in the first hot bottoms line 42 to the first desulfurization reactor 74 through hydraulic differential pressure.

The second stage desulfurized resid stream may exit the second desulfurization reactor 76 in the desulfurized effluent line 78, be cooled by heat exchange and enter the second stage separation section 18 comprising a second stage hot separator 80. The second stage separation section 18 comprises one or more separators in downstream communication with the second hydrotreating unit 16 including the second stage hot separator 80. The first desulfurized effluent line 78 delivers a cooled desulfurized effluent stream to the second stage hot separator 80. Accordingly, the second stage hot separator 80 is in downstream communication with the first desulfurization reactor 74 and the second desulfurization reactor 76.

The second stage hot separator 80 separates the desulfurized effluent stream to provide a hydrocarbonaceous, second stage hot vapor stream in a second hot overhead line 82 and a hydrocarbonaceous, second stage hot liquid stream in a second hot bottoms line 84. The second stage hot separator 80 may operate at about 177° C. (350° F.) to about 371° C. (700° F.) and preferably operates at about 232° C. (450° F.) to about 315° C. (600° F.). The second stage hot separator 80 may be operated at a slightly lower pressure than the second desulfurization reactor 76 accounting for pressure drop through intervening equipment. The second stage hot separator 80 may be operated at pressures between about 2.7 MPa (gauge) (393 psig) and about 17.0 MPa (gauge) (2459 psig). The hydrocarbonaceous, second stage vapor stream in the second hot overhead line 82 may have a temperature of the operating temperature of the second stage hot separator 80. The second stage hot liquid stream in the second hot bottoms line 84 may be fed to a hot flash drum 86.

The second stage hot vapor stream in the second hot overhead line 82 may be cooled by heat exchange before entering a second stage cold separator 88. The second stage cold separator 88 is in downstream communication with the hot overhead line 82 of the second stage hot separator 80. At a characteristic sublimation temperature, ammonia and hydrogen sulfide in the second hot overhead line 82 will combine to form ammonium bisulfide and ammonia, and chlorine will combine to form ammonium chloride. To prevent deposition of ammonium bisulfide or ammonium chloride salts in the second hot overhead line 82 transporting the second hot vapor stream, a suitable amount of wash water may be introduced into the second hot overhead line 82 by a second water wash line 90.

The second stage hot vapor stream may be separated in the second stage cold separator 88 to provide a second stage cold vapor stream comprising a hydrogen-rich gas stream including ammonia and hydrogen sulfide in a second cold overhead line 92 and a second stage cold liquid stream in a second cold bottoms line 72. The second stage cold separator 88 serves to separate hydrogen rich gas from hydrocarbon liquid in the second stage hot vapor stream into the second stage cold vapor stream for recycle to the first stage hydrotreating unit 12 and the second stage hydrotreating unit 16 in the second cold overhead line 92.

The second stage cold separator 88 may be operated at about 100° F. (38° C.) to about 150° F. (66° C.), suitably about 115° F. (46° C.) to about 145° F. (63° C.), and just below the pressure of the second desulfurization reactor 76 and the second stage hot separator 80 accounting for pressure drop through intervening equipment to keep hydrogen and light gases in the overhead and normally liquid hydrocarbons in the bottoms. The second stage cold separator 88 may be operated at pressures between about 1.6 MPa (gauge) (235 psig) and about 16.6 MPa (gauge) (2,401 psig). In one aspect, the second stage cold separator 88 operates at about 1.4 MPa (gauge) (200 psig) to about 3.5 MPa (gauge) (500 psig) lower than the first stage cold separator 46, so that the first hot liquid stream 42 from the first stage hot separator 38 can travel to the first desulfurization reactor 74 by hydraulic pressure differential. The second stage cold separator 88 may also have a boot for collecting an aqueous phase. The second stage cold liquid stream in the second cold bottoms line 72 may have a temperature of the operating temperature of the cold separator 88. The second stage cold liquid stream in the second cold bottoms line 72 may be delivered to the cold flash drum 70 and be separated together in the cold flash drum 70. In an embodiment the second stage cold liquid stream in the second cold liquid bottoms line 72 may be mixed with the first stage cold liquid stream in the first cold bottoms line 50 and be separated together in the cold flash drum 70.

The hydrocarbonaceous second hot liquid stream in the second hot bottoms line 84 may be sent to fractionation. In an aspect, the second hot liquid stream in the second hot bottoms line 84 may be let down in pressure and flashed in a hot flash drum 86 to provide a hot flash vapor stream of light ends in a hot flash overhead line 94 and a hot flash liquid stream in a hot flash bottoms line 96. The hot flash drum 86 may be in direct, downstream communication with the second hot bottoms line 84 and in downstream communication with the second hydrotreating unit 16. In an aspect, the hot flash liquid stream in the flash hot bottoms line 96 may be forwarded to product fractionation which may be preceded by stripping to remove hydrogen sulfide from product streams including a desulfurized resid stream. Accordingly, a stripping column and a fractionation column may be in downstream communication with the hot flash drum 86 and the hot flash bottoms line 96.

The hot flash drum 86 may be operated at the same temperature as the second hot separator 80 but at a lower pressure of between about 690 kPa (gauge) (100 psig) and about 6.9 MPa (gauge) (1000 psig), suitably no more than about 3.1 MPa (gauge) (450 psig). The flash hot liquid stream in the flash hot bottoms line 96 may have a temperature of the operating temperature of the hot flash drum 86.

In an aspect, the second cold liquid stream in the second cold bottoms line 72 may be sent to fractionation. In a further aspect, the second cold liquid stream in the second cold bottoms line 72 may be let down in pressure and flashed in a cold flash drum 70 to separate a flash gas stream in a cold flash overhead line 98 from a cold flash liquid stream in a cold flash bottoms line 100. The cold flash drum 70 may be in direct downstream communication with the second cold bottoms line 72 of the second stage cold separator 88. In an aspect, the first cold liquid stream in the first cold bottoms line 50 may be sent to fractionation. In a further aspect, the first cold liquid stream in the first cold bottoms line 50 may be let down in pressure and flashed in the cold flash drum 70 to provide a flash gas stream in a cold flash overhead line 98 and a cold flash liquid stream in a cold flash bottoms line 100. The cold flash drum 70 may be in direct downstream communication with the first cold bottoms line 50 of the first stage cold separator 46. In an aspect, the second cold liquid stream in the second cold bottoms line 72 and the first cold liquid stream in the first cold bottoms line 50 may be combined to provide a cold liquid stream in a cold liquid line 114 that may be sent to fractionation. In an aspect, the cold liquid stream in the cold bottoms line 114 may be flash separated in the cold flash drum 70. The cold flash liquid stream in the cold flash bottoms line 100 may be sent to product fractionation which may be preceded by stripping to remove hydrogen sulfide from product streams including a desulfurized resid stream comprising the cold flash liquid stream. Accordingly, a stripping column and a fractionation column may be in downstream communication with the cold flash drum 70 and the cold flash bottoms line 100. The first cold liquid stream in the first cold bottoms line 50 and the second cold liquid stream in the second cold bottoms line 72 may enter into the cold flash drum 70 either together in cold liquid line 114 or separately. In an aspect, the first cold bottoms line 50 joins the second cold bottoms line 72 and feeds the cold flash drum 70 together in the cold liquid line 114.

The cold flash drum 70 may be operated at the same temperature as the second cold separator 88 but typically at a lower pressure of between about 690 kPa (gauge) (100 psig) and about 6.9 MPa (gauge) (1000 psig) and preferably between about 3.0 MPa (gauge) (435 psig) and about 3.1 MPa (gauge) (450 psig). A flashed aqueous stream may be removed from a boot of the cold flash drum 70. The flash cold liquid stream in the flash cold bottoms line 100 may have the same temperature as the operating temperature of the cold flash drum 70.

The first stage cold vapor stream in the first cold overhead line 48 is rich in hydrogen. Thus, hydrogen can be recovered from the first stage cold vapor stream. The second stage cold vapor stream in the second cold overhead line 92 is also rich in hydrogen, so hydrogen can be recovered from the second stage cold vapor stream. In an embodiment, the first stage cold vapor stream in the first cold overhead line 48 and the second stage cold vapor stream in the second cold overhead line 92 are combined to provide a cold vapor stream in cold vapor line 62. The cold vapor stream can be compressed in a recycle gas compressor 102 for recycle as a recycle hydrogen stream to the first hydrotreating unit 12 and the second hydrotreating unit 16. However, the cold vapor stream comprises much of the hydrogen sulfide separated from the demetallized resid stream and the desulfurized resid stream. The cold vapor stream in the cold vapor line 62 may be passed through a trayed or packed recycle scrubbing column 52 where it is scrubbed by means of a scrubbing extraction liquid such as an aqueous solution fed by scrubbing liquid line 54 to remove and acid gases including hydrogen sulfide and carbon dioxide by extracting them into the aqueous solution. Preferred solvents include Selexol™ available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other amines can be used in place of or in addition to the preferred amines. The lean amine contacts the cold vapor stream and absorbs acid gas contaminants such as hydrogen sulfide and carbon dioxide. The resultant scrubbed cold vapor stream exits an overhead of the recycle scrubbing column 52 in a first absorber overhead line 56 with about 5 to about 5000 vppm of hydrogen sulfide still remaining in the scrubbed cold vapor stream. A rich amine stream is taken out from the bottoms at a bottom outlet of the recycle scrubber column 52 in a recycle scrubber bottoms line 58. The spent scrubbing liquid from the bottoms may be regenerated and recycled back to the recycle scrubbing column 52 in the scrubbing liquid line 54. The recycle scrubber column 52 may be operated at a temperature of about 40° C. (104° F.) to about 125° C. (257° F.) and a pressure of about 690 to about 1600 kPa. The temperature of the cold vapor stream in the cold vapor line 62 may be between about 20° C. (68° F.) and about 80° C. (176° F.) and the temperature of the scrubbing extraction liquid stream in the scrubbing liquid line 54 may be between about 20° C. (68° F.) and about 70° C. (158° F.).

The scrubbed cold vapor stream emerges from the recycle scrubber column 52 via the recycle scrubber overhead line 56 and split between a scrubbed recycle cold vapor stream in a recycle line 60 and a purge stream in purge line 64. The scrubbed recycle cold vapor stream in the recycle line 60 may be compressed in the recycle gas compressor 102 to provide the recycle hydrogen stream in recycle hydrogen line 104.

The purge stream in the purge line 64 may be fed to a membrane unit 66. The membrane unit comprises a membrane 106 and is in downstream communication with the scrubber column 52 via the purge line 64. The membrane may comprise a high selectivity polyimide membrane available from UOP LLC. In an aspect, the membrane may comprise a polyimide polymer with hydroxyl and acetoxy functional groups particularly suited for separation of methane from hydrogen. Other suitable membranes may include cellulose acetate, polysulfone or polyimide/polyamide. The polyimide polymer with hydroxyl and acetoxy functional groups that may be used for making the polyimide membrane suitable for methane-hydrogen separation may have a weight average molecular weight in the range of 50,000 to 1,000,000 Daltons, preferably between 70,000 to 500,000 Daltons. In the membrane unit 66, the purge stream contacts one side of the membrane 106 which allows more of the hydrogen to diffuse through the membrane than methane. A permeate stream is removed from an opposite side of the membrane 106 in a permeate line 108 comprising a greater proportion of hydrogen than in the purge stream and a smaller proportion of methane than in the purge stream. From the membrane unit 66, the hydrogen concentration in the permeate stream in the permeate line 108 may be at least about 98 mol % with the methane concentration being less than about 1%. The permeate stream in the permeate line 108 may be fed to a make-up gas compressor 112. A retentate stream in a retentate line 110 predominantly stays on the one side of the membrane 106 and has a greater proportion of methane than the purge stream and a smaller proportion of hydrogen that the purge vapor stream. From the membrane unit 66, the hydrogen concentration in the retentate stream in the retentate line 110 may be at least about 40 mol % with the methane concentration being no more than about 40 mol %. The retentate stream may be further processed to achieve further hydrogen recovery such as by co-processing with the flash gas stream in the cold flash overhead line 98 perhaps in an additional membrane unit that is not shown.

The recycle hydrogen stream in the recycle hydrogen line 104 is split at a split 120 between the first stage hydrogen stream in the first hydrogen line 24 and the second stage hydrogen stream in the second stage hydrogen line 68. The first stage hydrogen stream in the first hydrogen line 24 may be supplemented with make-up gas from a first make-up line 118 through a control valve thereon. Make-up gas from a second make-up hydrogen line 122 supplements the second stage hydrogen stream in the second hydrogen line 68. Accordingly, the first stage hydrogen stream in the first hydrogen line 24 is taken from the cold vapor stream in the cold vapor line 62 and the second stage hydrogen stream in the second stage hydrogen line 68 is also taken from the cold vapor stream in the cold vapor line 72. Additionally, the first stage hydrogen stream in the first hydrogen line 24 is taken from the first hot vapor stream in the first hot overhead line 40 from the first hydrotreating unit 12 and the second hot vapor stream in the second hot overhead line 82 from the second hydrotreating unit 16 and the second stage hydrogen stream in the second stage hydrogen line 68 is also taken from the first hot vapor stream in the first hot overhead line 40 from the first hydrotreating unit 12 and the second hot vapor stream in the second hot overhead line 82 from the second hydrotreating unit 16.

Figure 2:
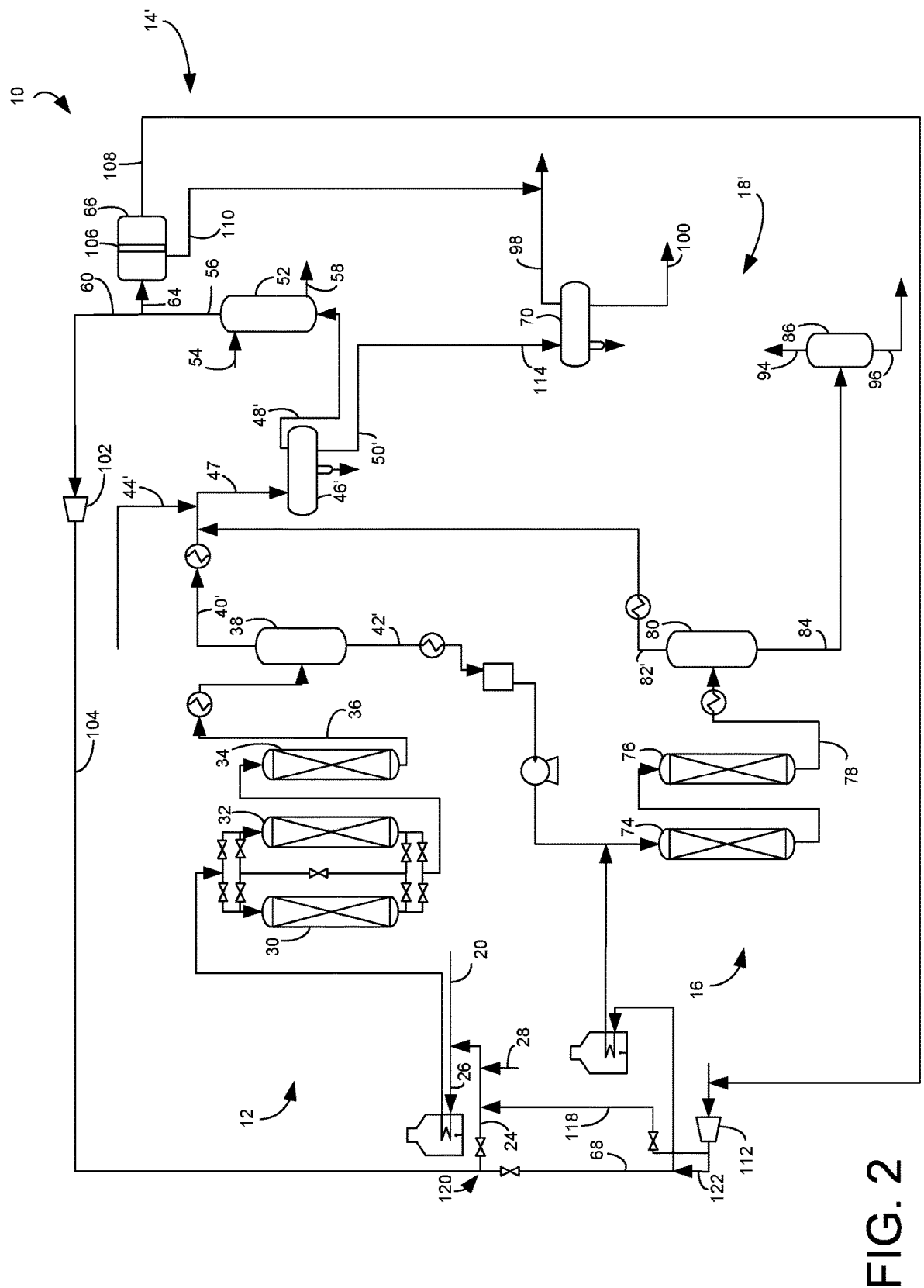
FIG. 2 is a schematic drawing of an alternative unit to FIG. 1.

FIG. 2 shows an embodiment in which the first stage hydrotreating unit 12 and the second stage hydrotreating unit 16 share a common cold separator 46'. Elements in FIG. 2 with the same configuration as in FIG. 1 have the same reference numeral as in FIG. 1. Elements in FIG. 2 which have a different configuration as the corresponding element in FIG. 1 have the same reference numeral but designated with a prime symbol ('). The configuration and operation of the embodiment of FIG. 2 is essentially the same as in FIG. 1 noting the following differences.

The first stage hot vapor stream in the first hot overhead line 40' is cooled, mixed with water from the water wash line 44' and introduced to the cold separator 46' in the first stage separation section 14'. Additionally, the second stage hot vapor stream in the second hot overhead line 82' is cooled, mixed with water from the water wash line 44' and introduced to the cold separator 46'. In an aspect, the first stage hot vapor stream in the first hot overhead line 40' and the second stage hot vapor stream in the second hot overhead line 82' may be combined before or after cooling and mixing with water to provide a combined hot vapor stream in a combined hot vapor line 47 and introduced to the cold separator 46' together. The cooled first stage hot vapor stream and the cooled second stage hot vapor stream may be separated in the cold separator 46' to provide a cold vapor stream comprising a hydrogen-rich gas stream including ammonia and hydrogen sulfide in a cold overhead line 48' and a cold liquid stream in a cold bottoms line 50'. The cold separator 46' serves to separate hydrogen rich gas from hydrocarbon liquid in the first stage hot vapor stream and the second stage hot vapor stream for recycle to the first stage hydrotreating unit 12 and the second stage hydrotreating unit 16. The cold separator 46', therefore, is in downstream communication with the first hot overhead line 40' of the first stage hot separator 38 and the second hot overhead line 82' of the second hot separator 80.

The cold separator 46' may be operated at about 100° F. (38° C.) to about 150° F. (66° C.), suitably about 115° F. (46° C.) to about 145° F. (63° C.), and just below the pressure of the last demetallation reactor 30, 32, 34 and the first stage hot separator 38 and the second desulfurization reactor 76 and the second stage hot separator 80 accounting for pressure drop through intervening equipment to keep hydrogen and light gases in the overhead and normally liquid hydrocarbons in the bottoms. The cold separator 46' may be operated at pressures between about 3 MPa (gauge) (435 psig) and about 20 MPa (gauge) (2,901 psig). The cold separator 46' may also have a boot for collecting an aqueous phase. The cold liquid stream in the cold bottoms line 50' may have a temperature of the operating temperature of the cold separator 46'. The cold liquid stream in the cold bottoms line 50' may be delivered to a cold flash drum 70. The cold flash drum 70 may be in downstream communication with the cold bottoms line 50' of the cold separator 46'.

In an embodiment, the cold vapor stream in the cold overhead line 48' can be compressed in a recycle gas compressor 102 for recycle as a recycle hydrogen stream to the first hydrotreating unit 12 and the second hydrotreating unit 16. However, the cold vapor stream comprises much of the hydrogen sulfide and ammonia separated from the demetallized resid stream and the desulfurized resid stream. The cold vapor stream in the cold vapor line 48' may be passed through a trayed or packed recycle scrubbing column 52 where it is scrubbed by means of a scrubbing extraction liquid such as an aqueous solution fed by scrubbing liquid line 54 to remove and acid gases including hydrogen sulfide and carbon dioxide by extracting them into the aqueous solution as explained for FIG. 1.

Accordingly, the first stage hydrogen stream in the first hydrogen line 24 is taken from the cold vapor stream in the cold vapor line 48' and the second stage hydrogen stream in the second stage hydrogen line 68 is also taken from the cold vapor stream in the cold vapor line 48'. Additionally, the first stage hydrogen stream in the first hydrogen line 24 is taken from the first hot vapor stream in the first hot overhead line 40' from the first hydrotreating unit 12 and the second hot vapor stream in the second hot overhead line 82' from the second hydrotreating unit 16 and the second stage hydrogen stream in the second stage hydrogen line 68 is also taken from the first hot vapor stream in the first hot overhead line 40' from the first hydrotreating unit 12 and the second hot vapor stream in the second hot overhead line 82' from the second hydrotreating unit 16.

The second separation section 18' omits a second cold separator because the common cold separator 46' is used for both hydrotreating stages 12 and 16. As a result, the first hot separator 38 and the first desulfurization reactor 74 of the second hydrotreating unit 16 operate at similar pressure levels. The first hot liquid stream in the first hot bottoms 42' is first cooled to a proper operating temperature, held up in a holding tank, pumped to combine with the heated second stage hydrogen stream in the second hydrogen line 68 and fed to the first desulfurization reactor 74 of the second hydrotreating unit 16. The rest of the process of the embodiment of FIG. 2 may be the same as described for FIG. 1.

EXAMPLES

Experimentation was conducted to determine the improving effect of the subject process on desulfurization of a resid stream with steps of demetallation in Example 1 and desulfurization in Example 2. The feedstock was Arabian medium atmospheric resid having 36,000 wppm sulfur, 31 wppm nickel, 89 wppm vanadium and 13 wt % Conradson carbon residue. The apparatus involved three tubular down flow reactors. Reactor 1 was loaded with KFR-15 catalyst available from Albemarle designed for hydrodemetallation reaction. Reactor 2 was loaded with 53 wt % KFR-15 catalyst and 47 wt % 15 KFR-33 catalyst available from Albemarle also designed for hydrodemetallation reactions. Reactor 3 was loaded with KFR-70 catalyst available from Albemarle designed for hydrodesulphurization reactions. All reactors were also loaded with inert quartz in the catalyst bed as diluent to ensure uniform flow distribution.

Example 1

Example 1 consists of one pair of experiments conducted to determine effect of water injection. The same configuration was applied with hydrodemetallation and hydrodesulfurization catalysts using Reactor 1, Reactor 2 and Reactor 3 in series at the same temperature and weight hourly space velocity and with no interstage separation. The only difference was the feed to the demetallation reactor in Experiment 1B was injected with water while Experiment 1A had no water injection into the feed.

Table 1 shows the experimental conditions for the single stage example for Reactors 1, 2 and 3 using both HDM and HDS catalyst. Water rate is based on fresh feed weight. The temperature was the catalyst weight averaged temperature. The weight hourly space velocity was based on the weight of the hydrocarbon resid feed only.

TABLE 1

|  | Experiment | |
|---|---|---|
|  | 1A | 1B |
| Catalyst | HDM + HDS | HDM + HDS |
| Sulfur, wppm | 36000 | 36000 |
| Water rate, wt % | 0% | 5% |
| Temperature, ° F. (° C.) | 727 (386) | 727 (386) |

Example 2

Example 2 consisted of one pair of experiments conducted to determine a baseline hydrodemetallation performance using Reactor 1 and Reactor 2 only at the same temperature with and without water injection to exemplify the first demetallation stage. Products were collected to be used as demetallized feed for the second desulfurization stage.

Table 2 shows the experimental conditions for the first stage example for Reactors 1 and 2 using HDM catalyst only. The water rate was based on fresh feed weight. The temperature was the catalyst weight averaged temperature. The weight hourly space velocity was based on the weight of the hydrocarbon resid feed only.

TABLE 2

|  | Experiment | |
|---|---|---|
|  | 2A | 2B |
| Catalyst | HDM | HDM |
| Sulfur, wppm | 36000 | 36000 |
| Water rate, wt % | 0% | 5% |
| Temperature, ° F. (° C.) | 711 (377) | 711 (377) |

Example 3

Example 3 consisted of one pair of experiments conducted to determine a baseline hydrodemetallation performance using Reactor 1 and Reactor 2 only at a same temperature with and without water injection to exemplify the first demetallation stage. Products were collected to be used as demetallized feed for the second desulfurization stage. The key difference of Example 3 from Example 2 lies in the reactor temperatures.

Table 3 shows the experimental conditions for the first stage example for Reactors 1 and 2 using HDM catalyst only. The water rate was based on fresh feed weight. The temperature was the catalyst weight averaged temperature. The weight hourly space velocity was based on the weight of the hydrocarbon resid feed only.

TABLE 3

|  | Experiment | |
|---|---|---|
|  | 3A | 3B |
| Catalyst | HDM | HDM |
| Sulfur, wppm | 36000 | 36000 |

TABLE 3-continued

|  | Experiment | |
|---|---|---|
|  | 3A | 3B |
| Water rate, wt % | 0% | 5% |
| Temperature, ° F. (° C.) | 726 (386) | 726 (386) |

Example 4

Demetallized resid products from Example 2 were used as feed to the desulfurization stage of Example 4 to exemplify a process with and without interstage separation to remove hydrogen sulfide. To represent the two stage concept having a separation step, hydrogen sulfide concentration was reduced to 0 and the flow rate was reduced by 15 wt % to represent removal of the first stage vapor stream from the demetallized feed resid stream. Because the apparatus could not retain the vapor from the first stage, we added 3 vol % hydrogen sulfide to the feed to the second desulfurization stage to represent the base case without interstage vapor removal. Unisim simulation software was used to determine hydrogen sulfide concentrations and overall flow rates with and without interstage separation. To keep comparisons equivalent, we reduced the flow rate of feed in the water injection case with interstage separation to maintain space velocities equivalent. For the water injection with interstage separation case, the flow rate was reduced by 15 wt % similar to the interstage case.

Table 4 shows the conditions and results for the second desulfurization stage. The weight hourly space velocity was based on the liquid hydrocarbon fed to the second desulfurization stage only. The temperature was the catalyst weight averaged temperature. The sulfur concentration was in the liquid product.

TABLE 4

|  | Experiment | | | |
|---|---|---|---|---|
|  | 4A | 4B | 4C | 4D |
| Case | Base case | Remove vapor | $H_2O$ inject, keep vapor | $H_2O$ inject, remove vapor |
| Hydrogen Sulfide, vol % | 3 | 0 | 3 | 0 |
| Feed from first stage product | 2A | 2A | 2B | 2B |
| WHSV, 1/hr | 0.63 | 0.55 | 0.55 | 0.55 |
| Temperature, ° F. (° C.) | 740 (393) | 740 (393) | 740 (393) | 740 (393) |
| Sulfur in product, wppm | 4245 | 3029 | 3395 | 2375 |

Example 5

Similar to Example 4, demetallized resid products from Example 3 were used as feed to the desulfurization stage of Example 5 to exemplify a process with and without interstage separation to remove hydrogen sulfide. To represent the two stage concept having a separation step, hydrogen sulfide concentration was reduced to 0 and the flow rate was reduced by 15 wt % to represent removal of the first stage vapor stream from the demetallized feed resid stream. Because the apparatus could not retain the vapor from the first stage, we added 3 vol % hydrogen sulfide to the feed to the second desulfurization stage to represent the base case without interstage vapor removal. Unisim simulation software was used to determine hydrogen sulfide concentration and overall flow rates with and without interstage separation. To keep comparisons equivalent, we reduced the flow rate of feed in the water injection case with interstage separation to maintain space velocities equivalent. For the water injection with interstage separation case, the flow rate was reduced by 15 wt % similar to the interstage case.

Table 5 shows the conditions and results for the second desulfurization stage. The weight hourly space velocity was based on the liquid hydrocarbon fed to the second desulfurization stage only. The temperature was the catalyst weight averaged temperature. The sulfur concentration was in the liquid product.

TABLE 5

| | Experiment | | | |
|---|---|---|---|---|
| | 5A | 5B | 5C | 5D |
| Case | Base case | Remove vapor | H₂O inject, keep vapor | H₂O inject, remove vapor |
| Hydrogen Sulfide, vol % | 3 | 0 | 3 | 0 |
| Product from first stage | 3A | 3A | 3B | 3B |
| WHSV, 1/hr | 0.63 | 0.55 | 0.55 | 0.55 |
| Temperature, ° F. (° C.) | 740 (393) | 740 (393) | 740 (393) | 740 (393) |
| Sulfur in product, wppm | 3865 | 2556 | 3300 | 2100 |

Tables 6, 7 and 8 summarize desulphurization rate constant calculations using Formula 1 for the results from Tables 1, 4 and 5:

$$k = \frac{\left[\frac{1}{(\text{Sulfur content in product})^{n-1}} - \frac{1}{(\text{Sulfur content in feed})^{n-1}}\right] \times WHSV}{\text{Exp}\left(E/R * \left(\frac{1}{700} - \frac{1}{400 + Temp}\right)\right)} \quad (1)$$

In Formula 1, "k" is the rate constant. "WHSV" is weight hourly space velocity based on the liquid hydrocarbon fed to the first demetallation stage and the second desulfurization stage. "Temp" is averaged reactor temperature in ° F. taken over both stages. Sulfur content is applied as $36000/1 \times 10^6$ when in terms of wppm. "E/R" is an activation term equaling the activation energy for hydrodesulfurization over the gas constant. We have taken E/R as 22,000 with 700° F. as a reference temperature.

Table 6 calculates the reaction rate constant from the data of Example 1.

TABLE 6

| | Base case | Water injection only |
|---|---|---|
| Sulfur content in feed, wppm | 36000 | 36000 |
| Sulfur content in liquid product, wppm | 3895 | 3409 |
| Temperature, ° F. (° C.) | 727 (386) | 727 (386) |
| WHSV, 1/hr | 0.34 | 0.34 |
| Activation energy term, E/R, cal/mol | 22000 | 22000 |
| Desulfurization reaction order, n | 2 | 2 |
| Rate constant, k, 1/hr | 50.6 | 58.6 |
| Improvement Delta | 0 | 8.0 |

The rate constant, k, indicates how fast organic sulfur is converted to hydrogen sulfide and hydrocarbon. The improvement in the rate constant for water injected into the demetallation stage is shown as 8 l/hr.

Table 7 calculates the reaction rate constant for the data from related Examples 2 and 4.

TABLE 7

| | Base case | Two stage with vapor removal | Water injection only | Water injection and two stage with vapor removal |
|---|---|---|---|---|
| Sulfur content in feed, wppm | 36000 | 36000 | 36000 | 36000 |
| Sulfur content in liquid product, wppm | 4245 | 3029 | 3395 | 2375 |
| Temperature, ° F. (° C.) | 727 (386) | 727 (386) | 727 (386) | 727 (386) |
| WHSV, 1/hr | 0.34 | 0.31 | 0.31 | 0.31 |
| Activation energy term, E/R, cal/mol | 22000 | 22000 | 22000 | 22000 |
| Desulfurization reaction order, n | 2 | 2 | 2 | 2 |
| Rate constant, k, 1/hr | 46 | 62 | 54.7 | 81 |
| Improvement Delta | 0 | 16 | 8.7 | 35 |

The rate constant, k, indicates how fast organic sulfur is converted to hydrogen sulfide and hydrocarbon. The improvement in the rate constant for water injected into the demetallation stage followed by removal of hydrogen sulfide before the desulfurization stage is greater than the improvement in the individual rate constant for each of water injection and hydrogen sulfide removal by 42% for Examples 2 and 4. Therefore, water injection into the demetallation stage followed by removal of hydrogen sulfide before the desulfurization stage provides an unexpected synergetic effect.

Table 8 calculates the reaction rate constant from the data from related Examples 3 and 5.

TABLE 8

| | Base case | Two stage with vapor removal | Water injection only | Water injection and two stage with vapor removal |
|---|---|---|---|---|
| Sulfur content in feed, wppm | 36000 | 36000 | 36000 | 36000 |
| Sulfur content in liquid product, wppm | 3865 | 2556 | 3300 | 2100 |
| Temperature, ° F. (° C.) | 734 (390) | 734 (390) | 734 (390) | 734 (390) |
| WHSV, 1/hr | 0.34 | 0.31 | 0.31 | 0.31 |
| Activation energy term, E/R, cal/mol | 22000 | 22000 | 22000 | 22000 |
| Desulfurization reaction order, n | 2 | 2 | 2 | 2 |
| Rate constant, k, 1/hr | 45.7 | 66.8 | 50.6 | 82.4 |
| Improvement Delta | 0 | 21.1 | 4.9 | 36.7 |

The improvement in the rate constant for water injected into the demetallation stage followed by removal of hydrogen sulfide before the desulfurization stage is greater than the improvement in the individual rate constant for each of water injection and hydrogen sulfide removal by 41% for Examples 3 and 5. Therefore, water injection into the demetallation stage followed by removal of hydrogen sulfide before the desulfurization stage provides an unexpected synergetic effect in both data from pairs of Examples 2 and 4, and Examples 3 and 5.

SPECIFIC EMBODIMENTS

While the following is described in conjunction with specific embodiments, it will be understood that this description is intended to illustrate and not limit the scope of the preceding description and the appended claims.

A first embodiment of the invention is a process for hydrotreating a hydrocarbon resid stream comprising adding a first stage hydrogen stream to a resid stream; hydrotreating the resid stream over a demetallation catalyst to demetallize the resid stream in the presence of the first stage hydrogen stream to provide a demetallized resid stream reduced in metals and sulfur concentration; separating the demetallized resid stream into a first stage hot vapor stream and a first stage hot liquid stream with a smaller concentration of hydrogen sulfide than in the demetallized resid stream; adding a second stage hydrogen stream to the first stage liquid stream; and hydrotreating the first stage liquid stream over a desulfurization catalyst and the second stage hydrogen stream to provide a desulfurized resid stream; separating the desulfurized resid stream into a second stage hot vapor stream and a second stage hot liquid stream with a smaller concentration of hydrogen sulfide than in the desulfurized resid stream; separating the first stage hot vapor stream and the second stage hot vapor stream to provide a cold vapor stream and a cold liquid stream; compressing the cold vapor stream to provide a recycle hydrogen stream; and splitting the recycle hydrogen stream into the first stage hydrogen stream and the second stage hydrogen stream. An embodiment of the invention is one, any or all of prior embodiments in this paragraph up through the first embodiment in this paragraph wherein separating the first stage hot vapor stream and the second stage hot vapor stream to provide a cold vapor stream and a cold liquid stream further comprises separating the first stage hot vapor stream into a first stage cold vapor stream and a first stage cold liquid stream and separating the second stage hot vapor stream into a second stage cold vapor stream and a second stage cold liquid stream and combining the first stage cold vapor stream and the second stage cold vapor stream to provide the cold vapor stream. An embodiment of the invention is one, any or all of prior embodiments in this paragraph up through the first embodiment in this paragraph wherein separating the first stage hot vapor stream and the second stage hot vapor stream to provide a cold vapor stream and a cold liquid stream further comprises combining the first stage hot vapor stream and the second stage hot vapor stream, separating the first stage hot vapor stream and the second stage hot vapor stream together into the cold vapor stream and the cold liquid stream. An embodiment of the invention is one, any or all of prior embodiments in this paragraph up through the first embodiment in this paragraph further comprising absorbing hydrogen sulfide from the cold vapor stream into a solvent to provide a scrubbed cold vapor stream and compressing the scrubbed cold vapor stream. An embodiment of the invention is one, any or all of prior embodiments in this paragraph up through the first embodiment in this paragraph further comprising splitting the scrubbed cold vapor stream into a purge stream and a recycle cold vapor stream and compressing the recycle cold vapor stream. An embodiment of the invention is one, any or all of prior embodiments in this paragraph up through the first embodiment in this paragraph further comprising contacting the purge stream on one side of a membrane and transporting a permeate gas from the membrane to a make-up gas compressor. An embodiment of the invention is one, any or all of prior embodiments in this paragraph up through the first embodiment in this paragraph wherein the resid stream comprise an asphaltic sulfur concentration of at least 10 wt % of total sulfur. An embodiment of the invention is one, any or all of prior embodiments in this paragraph up through the first embodiment in this paragraph further comprising fractionating the second stage hot liquid stream. An embodiment of the invention is one, any or all of prior embodiments in this paragraph up through the first embodiment in this paragraph further comprising fractionating the cold liquid stream. An embodiment of the invention is one, any or all of prior embodiments in this paragraph up through the first embodiment in this paragraph further comprising flashing the second stage hot liquid stream to provide a hot flash vapor stream and a hot flash liquid stream and fractionating the hot flash liquid stream. An embodiment of the invention is one, any or all of prior embodiments in this paragraph up through the first embodiment in this paragraph further comprising flashing the cold liquid stream into a cold flash liquid stream and a cold flash vapor stream and fractionating the cold flash liquid stream.

A second embodiment of the invention is a process for hydrotreating a hydrocarbon resid stream comprising adding a first stage hydrogen stream to a resid stream; hydrotreating the resid stream over a demetallation catalyst to demetallize the resid stream in the presence of the first stage hydrogen stream to provide a demetallized resid stream reduced in metals and sulfur concentration; separating the demetallized resid stream into a first stage hot vapor stream and a first stage hot liquid stream with a smaller concentration of hydrogen sulfide than in the demetallized resid stream; adding a second stage hydrogen stream to the first stage liquid stream; and hydrotreating the first stage liquid stream over a desulfurization catalyst and the second stage hydrogen stream to provide a desulfurized resid stream; separating the desulfurized resid stream into a second stage hot vapor stream and a second stage hot liquid stream with a smaller concentration of hydrogen sulfide than in the desulfurized resid stream; separating the first stage hot vapor stream and the second stage hot vapor stream to provide a cold vapor stream and a cold liquid stream; compressing the cold vapor stream to provide a recycle hydrogen stream; and taking the first stage hydrogen stream from the recycle hydrogen stream and taking the second stage hydrogen stream from the recycle hydrogen stream. An embodiment of the invention is one, any or all of prior embodiments in this paragraph up through the second embodiment in this paragraph wherein separating the first stage hot vapor stream and the second stage hot vapor stream to provide a cold vapor stream and a cold liquid stream further comprises separating the first stage hot vapor stream into a first stage cold vapor stream and a first stage cold liquid stream and separating the second stage hot vapor stream into a second stage cold vapor stream and a second stage cold liquid stream and combining the first stage cold vapor stream and the second stage cold vapor stream to provide the cold vapor stream. An embodiment of the invention is one, any or all of prior embodiments in this paragraph up through the second embodiment in this paragraph wherein separating the first stage hot vapor stream and the second stage hot vapor stream to provide a cold vapor stream and a cold liquid stream further comprises combining the first stage hot vapor stream and the second stage hot vapor stream, separating the first stage hot vapor stream and the second stage hot vapor stream together into the cold vapor stream and the cold liquid stream. An embodiment of the invention is one, any or all of prior embodiments in this paragraph up through the second embodiment in this paragraph further comprising absorbing hydrogen sulfide from the cold vapor stream into a solvent to provide a scrubbed cold vapor stream and taking the first stage hydrogen stream from the scrubbed cold vapor stream and taking the second stage hydrogen stream from the scrubbed cold vapor stream. An embodiment of the invention is one, any or all of prior embodiments in this paragraph up through the second embodiment in this paragraph wherein the resid stream comprise an asphaltic sulfur concentration of at least 10 wt % of total sulfur.

A third embodiment of the invention is a process for hydrotreating a hydrocarbon resid stream comprising hydrotreating the resid stream over a demetallation catalyst to demetallize the resid stream in the presence of a first stage hydrogen stream to provide a demetallized resid stream reduced in metals and sulfur concentration; separating the demetallized resid stream into a first stage hot vapor stream and a first stage hot liquid stream with a smaller concentration of hydrogen sulfide than in the demetallized resid stream; hydrotreating the first stage liquid stream over a desulfurization catalyst and a second stage hydrogen stream to provide a desulfurized resid stream; separating the desulfurized resid stream into a second stage hot vapor stream and a second stage hot liquid stream with a smaller concentration of hydrogen sulfide than in the desulfurized resid stream; combining the first stage hot vapor stream and the second stage hot vapor stream, separating the first stage hot vapor stream and the second stage hot vapor stream together into a cold vapor stream and the cold liquid stream; and taking the first stage hydrogen stream from the cold vapor stream and taking the second stage hydrogen stream from the cold vapor stream. An embodiment of the invention is one, any or all of prior embodiments in this paragraph up through the third embodiment in this paragraph further comprising absorbing hydrogen sulfide from the cold vapor stream into a solvent to provide a scrubbed cold vapor stream and taking the first stage hydrogen stream from the scrubbed cold vapor stream and taking the second stage hydrogen stream from the scrubbed cold vapor stream. An embodiment of the invention is one, any or all of prior embodiments in this paragraph up through the third embodiment in this paragraph wherein the resid stream comprise an asphaltic sulfur concentration of at least 10 wt % of total sulfur. An embodiment of the invention is one, any or all of prior embodiments in this paragraph up through the third embodiment in this paragraph further comprising fractionating the second stage hot liquid stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydrotreating a hydrocarbon resid stream comprising:
adding a first stage hydrogen stream and a water stream to a resid stream;
hydrotreating said resid stream over a demetallation catalyst to demetallize said resid stream in the presence of the first stage hydrogen stream to provide a demetallized resid stream reduced in metals and sulfur concentration, wherein said demetallation catalyst has a pore size distribution with at least about 25% of the pores on said demetallation catalyst being characterized as large pores;
separating said demetallized resid stream into a first stage hot vapor stream and a first stage hot liquid stream with a smaller concentration of hydrogen sulfide than in the demetallized resid stream;
adding a second stage hydrogen stream to said first stage liquid stream; and
hydrotreating said first stage liquid stream over a desulfurization catalyst and the second stage hydrogen stream to provide a desulfurized resid stream;
separating said desulfurized resid stream into a second stage hot vapor stream and a second stage hot liquid stream with a smaller concentration of hydrogen sulfide than in the desulfurized resid stream;
separating said first stage hot vapor stream and said second stage hot vapor stream to provide a cold vapor stream and a cold liquid stream;
compressing said cold vapor stream to provide a recycle hydrogen stream; and
splitting said recycle hydrogen stream into said first stage hydrogen stream and said second stage hydrogen stream.

2. The process of claim 1 wherein separating said first stage hot vapor stream and said second stage hot vapor stream to provide a cold vapor stream and a cold liquid stream further comprises separating said first stage hot vapor stream into a first stage cold vapor stream and a first stage cold liquid stream and separating said second stage hot vapor stream into a second stage cold vapor stream and a second stage cold liquid stream and combining said first stage cold vapor stream and said second stage cold vapor stream to provide said cold vapor stream.

3. The process of claim 1 wherein separating said first stage hot vapor stream and said second stage hot vapor stream to provide a cold vapor stream and a cold liquid stream further comprises combining said first stage hot vapor stream and said second stage hot vapor stream, separating said first stage hot vapor stream and said second stage hot vapor stream together into said cold vapor stream and said cold liquid stream.

4. The process of claim 1 further comprising absorbing hydrogen sulfide from said cold vapor stream into a solvent to provide a scrubbed cold vapor stream and compressing said scrubbed cold vapor stream.

5. The process of claim 4 further comprising splitting said scrubbed cold vapor stream into a purge stream and a recycle cold vapor stream and compressing said recycle cold vapor stream.

6. The process of claim 5 further comprising contacting said purge stream on one side of a membrane and transporting a permeate gas from said membrane to a make-up gas compressor.

7. The process of claim 1 wherein said resid stream comprise an asphaltic sulfur concentration of at least 10 wt % of total sulfur.

8. The process of claim 1 further comprising fractionating said second stage hot liquid stream.

9. The process of claim 8 further comprising fractionating said cold liquid stream.

10. The process of claim 8 further comprising flashing said second stage hot liquid stream to provide a hot flash vapor stream and a hot flash liquid stream and fractionating said hot flash liquid stream.

11. The process of claim 9 further comprising flashing said cold liquid stream into a cold flash liquid stream and a cold flash vapor stream and fractionating said cold flash liquid stream.

12. A process for hydrotreating a hydrocarbon resid stream comprising:
    adding a first stage hydrogen stream and a water stream to a resid stream;
    hydrotreating said resid stream over a demetallation catalyst to demetallize said resid stream in the presence of the first stage hydrogen stream to provide a demetallized resid stream reduced in metals and sulfur concentration;
    separating said demetallized resid stream into a first stage hot vapor stream and a first stage hot liquid stream with a smaller concentration of hydrogen sulfide than in the demetallized resid stream;
    adding a second stage hydrogen stream to said first stage liquid stream; and
    hydrotreating said first stage liquid stream over a desulfurization catalyst and the second stage hydrogen stream to provide a desulfurized resid stream;
    separating said desulfurized resid stream into a second stage hot vapor stream and a second stage hot liquid stream with a smaller concentration of hydrogen sulfide than in the desulfurized resid stream;
    separating said first stage hot vapor stream and said second stage hot vapor stream to provide a cold vapor stream and a cold liquid stream;
    compressing said cold vapor stream to provide a recycle hydrogen stream; and
    taking said first stage hydrogen stream from said recycle hydrogen stream and taking said second stage hydrogen stream from said recycle hydrogen stream.

13. The process of claim 12 wherein separating said first stage hot vapor stream and said second stage hot vapor stream to provide a cold vapor stream and a cold liquid stream further comprises separating said first stage hot vapor stream into a first stage cold vapor stream and a first stage cold liquid stream and separating said second stage hot vapor stream into a second stage cold vapor stream and a second stage cold liquid stream and combining said first stage cold vapor stream and said second stage cold vapor stream to provide said cold vapor stream.

14. The process of claim 12 wherein separating said first stage hot vapor stream and said second stage hot vapor stream to provide a cold vapor stream and a cold liquid stream further comprises combining said first stage hot vapor stream and said second stage hot vapor stream, separating said first stage hot vapor stream and said second stage hot vapor stream together into said cold vapor stream and said cold liquid stream.

15. The process of claim 12 further comprising absorbing hydrogen sulfide from said cold vapor stream into a solvent to provide a scrubbed cold vapor stream and taking said first stage hydrogen stream from said scrubbed cold vapor stream and taking said second stage hydrogen stream from said scrubbed cold vapor stream.

16. The process of claim 12 wherein said resid stream comprise an asphaltic sulfur concentration of at least 10 wt % of total sulfur.

17. A process for hydrotreating a hydrocarbon resid stream comprising:
    hydrotreating said resid stream over a demetallation catalyst to demetallize said resid stream in the presence of a first stage hydrogen stream to provide a demetallized resid stream reduced in metals and sulfur concentration, wherein said demetallation catalyst has a bimodal pore size distribution with at least about 25% of the pores on said demetallation catalyst being characterized as large pores;
    separating said demetallized resid stream into a first stage hot vapor stream and a first stage hot liquid stream with a smaller concentration of hydrogen sulfide than in the demetallized resid stream;
    hydrotreating said first stage liquid stream over a desulfurization catalyst and a second stage hydrogen stream to provide a desulfurized resid stream, wherein said desulfurization catalyst has a monomodal pore size distribution;
    separating said desulfurized resid stream into a second stage hot vapor stream and a second stage hot liquid stream with a smaller concentration of hydrogen sulfide than in the desulfurized resid stream;
    combining said first stage hot vapor stream and said second stage hot vapor stream, separating said first stage hot vapor stream and said second stage hot vapor stream together into a cold vapor stream and said cold liquid stream; and
    taking said first stage hydrogen stream from said cold vapor stream and taking said second stage hydrogen stream from said cold vapor stream.

18. The process of claim 17 further comprising absorbing hydrogen sulfide from said cold vapor stream into a solvent to provide a scrubbed cold vapor stream and taking said first stage hydrogen stream from said scrubbed cold vapor stream and taking said second stage hydrogen stream from said scrubbed cold vapor stream.

19. The process of claim 17 wherein said resid stream comprise an asphaltic sulfur concentration of at least 10 wt % of total sulfur.

20. The process of claim 17 further comprising fractionating said second stage hot liquid stream.

* * * * *